United States Patent
Patterson et al.

(10) Patent No.: US 6,390,133 B1
(45) Date of Patent: May 21, 2002

(54) HYDRAULIC ACCUMULATOR VENT AND METHOD FOR MAKING THE SAME

(75) Inventors: Douglas T. Patterson, Goose Creek, SC (US); Gerd A. Baur, Rettenberg (DE); Paul H. Hanson, Mt. Pleasant, SC (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/572,740

(22) Filed: May 17, 2000

(51) Int. Cl.[7] ............................................. F16L 55/04
(52) U.S. Cl. .............................. 138/31; 138/30; 60/413
(58) Field of Search ....................... 138/31, 30; 60/405, 60/413, 548

(56) References Cited

U.S. PATENT DOCUMENTS

| | | | |
|---|---|---|---|
| 3,378,912 A | | 4/1968 | Wallace |
| 3,579,767 A | | 5/1971 | Reider |
| 3,683,619 A | * | 8/1972 | Belart .......................... 60/548 |
| 3,719,044 A | * | 3/1973 | Bach ............................ 60/404 |
| 3,724,332 A | * | 4/1973 | Bach ............................ 60/548 |
| 3,879,948 A | * | 4/1975 | Flory ........................... 60/548 |
| 3,907,001 A | | 9/1975 | Vanderlaan et al. |
| 4,078,385 A | * | 3/1978 | Zabadneh .................... 60/548 |
| 4,123,117 A | * | 10/1978 | Adachi ......................... 60/548 |
| 4,178,757 A | * | 12/1979 | Ketterling et al. ............. 60/548 |
| 4,217,758 A | | 8/1980 | Bach et al. |
| 4,223,533 A | * | 9/1980 | Valentin ....................... 60/548 |
| 4,462,147 A | | 7/1984 | Herb et al. |
| 4,489,555 A | * | 12/1984 | Leiber .......................... 60/548 |
| 4,651,782 A | | 3/1987 | Fulmer |
| 4,693,276 A | | 9/1987 | Fulmer |
| 4,769,990 A | * | 9/1988 | Bach et al. .................... 138/31 |
| 5,301,783 A | * | 4/1994 | Malloy ......................... 138/31 |
| 5,460,438 A | | 10/1995 | Hellmann et al. |
| 5,727,852 A | | 3/1998 | Pueschel et al. |
| 5,735,124 A | * | 4/1998 | Cords et al. ................... 60/548 |
| 5,735,314 A | | 4/1998 | Alaze et al. |
| 5,975,653 A | | 11/1999 | Zaviska |
| 6,203,117 B1 | * | 3/2001 | Starr et al. .................... 138/31 |

FOREIGN PATENT DOCUMENTS

| | | |
|---|---|---|
| DE | 27 12 135 A1 | 9/1978 |
| DE | 4032875 | 4/1992 |
| EP | 0 256 240 A1 | 2/1988 |

* cited by examiner

*Primary Examiner*—James Hook
(74) *Attorney, Agent, or Firm*—Michael Best & Friedrich LLP

(57) ABSTRACT

A hydraulic accumulator assembly for a hydraulic brake system. The accumulator assembly includes a pump housing having therein at least one accumulator bore. The accumulator bore has an axis and an inner wall. A piston is movable within the accumulator bore and divides the accumulator bore into an accumulator chamber, which is communicable with the hydraulic brake system, and a spring chamber. There is a spring in the spring chamber for biasing the piston in the direction of the accumulator chamber. A passageway in the pump housing is closely spaced from the inner wall so as to form a relatively thin wall thickness between the passageway and the inner wall. A vent bore is punched in the inner wall and communicates between the spring chamber and the passageway. The vent bore is punched in a direction away from the axis.

28 Claims, 1 Drawing Sheet

HYDRAULIC ACCUMULATOR VENT AND METHOD FOR MAKING THE SAME

FIELD OF THE INVENTION

The invention relates to hydraulic accumulators and more specifically to methods of venting hydraulic accumulators.

BACKGROUND OF THE INVENTION

It is known to utilize hydraulic accumulators in conjunction with hydraulic brake systems equipped with an antilock system or a traction control system. The hydraulic accumulators temporarily receive excess brake fluid from wheel-mounted brake cylinders in order to reduce the pressure in the brake cylinders in a sufficiently rapid manner. The brake fluid is later withdrawn from the accumulator as needed.

Accumulators of this type may be sealed from the environment, trapping a volume of air inside the spring chamber or behind the accumulator piston. It is often advantageous to vent the accumulator so that trapped air does not affect the performance. Venting the trapped air to a larger air volume relieves the high air pressures in the accumulator that could adversely affect the function of the accumulator.

U.S. Pat. No. 4,769,990 to Bach et al. illustrates a combination accumulator and variable volume sump for use in a vehicle antilock brake system. The accumulator includes a piston with a reduced diameter section in communication with a vent, which in turn communicates with the atmosphere. Air in the system is displaced via the vent.

SUMMARY OF THE INVENTION

Vented accumulators present several practical problems. Vents are typically formed by drilling through the housing and directly into the accumulator bore. The drilling process leaves raised burrs on the inside wall of the accumulator that snag on and damage the piston and/or its sealing member (i.e., an O-ring) as it is inserted into the accumulator bore during assembly. This damage is difficult, if not impossible, to detect in a sealed accumulator.

Furthermore, the raised burr may hinder the piston stroke during operation of the accumulator, causing further damage to the piston and/or its sealing member, as well as potentially impairing the operation of the hydraulic braking system. To remedy any hindrance created during operational movement of the piston, the piston must often be designed to include a reduced diameter portion over the range where direct contact would otherwise be experienced. This may require extra machining operations and/or difficult injection molding techniques.

Attempts to eliminate the inevitably produced burrs have resulted in intricate and time consuming de-burring processes. The de-burring processes are complicated by the size and shape constraints of the accumulator bore. Finding the proper equipment to fit inside the accumulator bore, in addition to finding an operator who can adequately remove the burr from the cylindrically toleranced wall without leaving edges or ridges that will pose the same problems as the burr itself, has proven difficult.

Another practical problem with drilling the vents directly into the accumulator bore arises in light of the need to minimize the cross-sectional area of intersection between the accumulator wall and the vent hole. It is often necessary, due to the configuration of the housing and various other components, to drill at least one common passageway that is shared by distinct vent bores, thereby connecting the common passageway to individual accumulators. The distinct vent bores must be drilled to intersect the common passageway and then intersect the accumulator bore perpendicularly. This often requires multiple drilling operations as well as the need to close off the distinct vent bores after the connections have been made. This technique is time-consuming and burdensome.

The present invention alleviates the above-identified problems with venting hydraulic accumulators. The invention provides an accumulator having a vent that poses virtually no risk of damage to the piston or the piston sealing member and presents virtually no obstacles to the successful operation of the accumulator and the braking system as a whole. The vent is fast and easy to construct with minimal operational steps and no complex tooling or techniques.

Specifically, the invention provides a hydraulic accumulator assembly including a pump housing having therein at least one accumulator bore. The accumulator bore has an axis and an inner wall. A piston is movable within the accumulator bore and divides the accumulator bore into an accumulator chamber, which is communicable with the hydraulic brake system, and a spring chamber. A spring in the spring chamber biases the piston in the direction of the accumulator chamber. A passageway in the pump housing is closely spaced from the inner wall so as to form a relatively thin wall thickness between the passageway and the inner wall. A vent bore is punched in the inner wall and communicates between the spring chamber and the passageway. The vent bore is punched in a direction away from the axis.

In one embodiment, the relatively thin wall thickness between the passageway and the inner wall is approximately 0.5 mm. In another embodiment, the vent bore is formed by a punching stroke substantially perpendicular to the axis.

Other features and advantages of the invention will become apparent to those skilled in the art upon review of the following detailed description, claims, and drawings.

Figure 1:
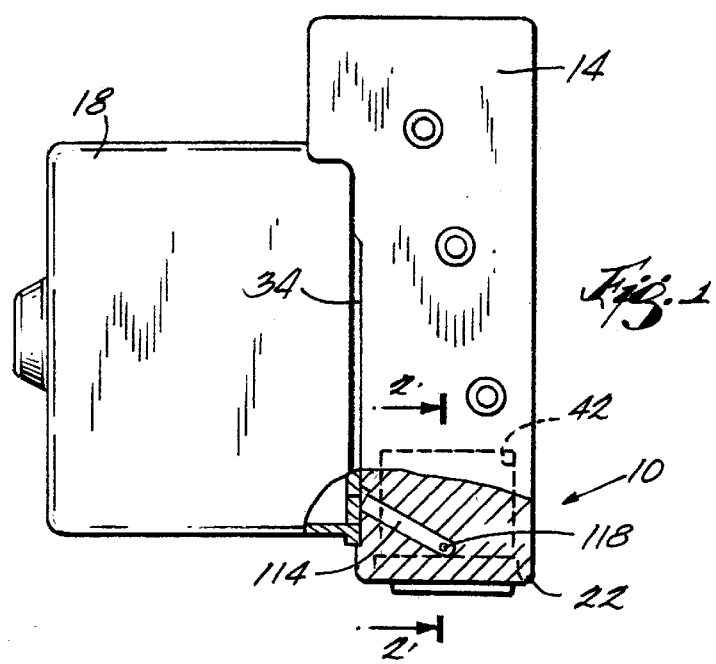
FIG. 1 is a partially cut-away view of a hydraulic accumulator assembly embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

A hydraulic accumulator 10 embodying the invention is shown in the drawings. As seen in FIG. 1, the accumulator 10 is located in a sealed pump housing 14. The pump housing 14 is hermetically mounted to a motor 18 and an ECU (not shown). The accumulator 10 and pump housing 14 communicate with the rest of the hydraulic brake system (not shown) of the vehicle (not shown).

Figure 2:
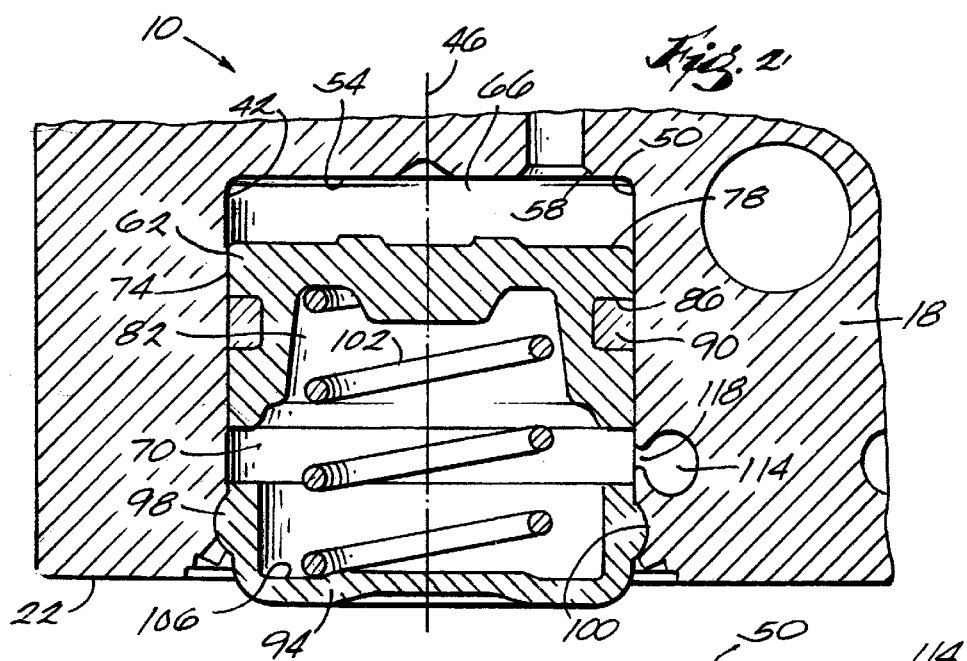
FIG. 2 is a view taken along line 2—2 in FIG. 1.

As shown in FIGS. 1 and 2, the pump housing 14 has a bottom surface 22 and a rear surface 34. When the pump housing 14 is mounted to the motor 18, the rear surface 34 is adjacent to the motor 18 as will be described below. The pump housing 14 can be made from aluminum, steel or any other suitable material.

At least one (see FIGS. 1 and 2) accumulator bore 42 is located in the pump housing 14. The accumulator bore 42 is open along the bottom surface 22 and has an axis 46, an inner wall 50 and an end wall 54. The inner wall 50 is preferably cylindrical, but this need not be the case. The inner wall 50 could be polygonal or elliptical. The end wall 54 includes at least one, and preferably two (only one is shown) openings 58 that provide communication between the accumulator bore 42 and the remainder of the hydraulic brake system (not shown). The openings 58 allow hydraulic brake fluid (not shown) to enter and exit the accumulator bore 42 as will be further described below.

As seen in FIG. 2, a piston 62 is movable in the accumulator bore 42 and divides the accumulator bore 42 into an accumulator chamber 66 (above the piston in FIG. 2) and a spring chamber 70 (below the piston in FIG. 2). The accumulator chamber 66 communicates with the openings 58 and accumulates excess hydraulic brake fluid (not shown). The piston 62 is preferably made from plastic and can be injection molded to include a sidewall 74, an end wall 78, a spring receiving recess 82 and a groove 86 housing a sealing member or O-ring 90. The sealing member 90 substantially prevents brake fluid from entering the spring chamber 70 between the piston sidewall 74 and the accumulator bore inner wall 50. As will be emphasized below, the integrity of the sealing member 90 is crucial to the smooth operation of the accumulator 10. It is important to note that the piston 62 could be made of any other suitable material such as metal or rubber, and that the sealing member 90 could be integral with the piston 62 (i.e., in the case of a rubber piston).

A cover 94 is mounted over the open end of the accumulator bore 42. In the illustrated embodiment, the cover 94 has an annular rib or projection 98 that fits into a recess or groove 100 in the inner wall 50 of the accumulator bore 42. To seal the accumulator bore 42 from the environment, material can be staked over the cover as is commonly known. After staking, the seal between the cover 94 and the accumulator bore 42 is substantially air-tight to keep dirt, dust and other impurities out of the accumulator 10. It is important to note that any sealing method known in the art can be substituted for the staking method described above. The cover has an inner surface 106 and is preferably made from plastic, metal or rubber.

A compression spring 102 is located in the spring chamber 70. One end of spring 102 is received in the spring receiving recess 82 of the piston 62. The other end of the spring 102 engages the inner surface 106 of the cover 94. The spring 102 biases the piston 62 in the direction of the accumulator chamber 66 (upward in FIG. 2). When no brake fluid is present in the accumulator chamber 66, the piston end wall 78 abuts the accumulator bore end wall 54. When brake fluid enters the accumulator chamber 66 through opening 58, the brake fluid applies pressure to the piston end wall 78 and thereby compresses the spring 102 and moves the piston 62 in the direction of the spring chamber 70 (downward in FIG. 2). Brake fluid enters the accumulator chamber 66 until the force exerted on the piston 62 by the pressure of the fluid in the hydraulic braking system is equal to the force exerted on the piston 62 by the spring 102. The brake fluid remains in the accumulator chamber 66 until the force exerted by the spring 102 is greater than the force of the fluid on the piston 62, at which point fluid exits the accumulator chamber 66 through opening 58, allowing the piston 62 to move in the direction of the accumulator chamber 66. It is critical that the sealing member 90 substantially prevents fluid from entering the spring chamber 70. If fluid were allowed to pass into the spring chamber 70, the delicate pressure balance in the accumulator 10 would be lost. Furthermore, fluid build-up in the spring chamber 70 would create a deficiency in fluid that is needed in the braking system to aid in stopping the vehicle (not shown).

Figure 3:
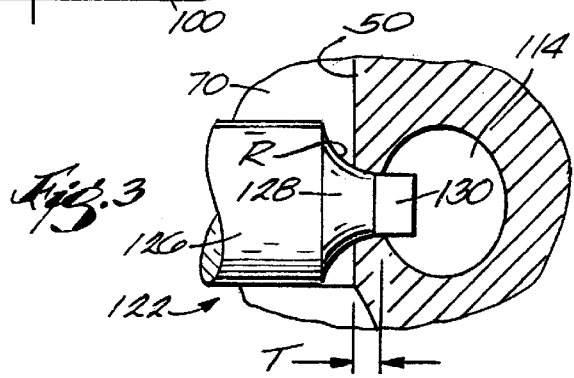
FIG. 3 is an enlarged view illustrating the punching stroke used to vent the accumulator.

Since the sealing member 90 and the cover 94 effectively seal the air volume in the spring chamber 70 from the environment, it is often desirable or necessary to vent the spring chamber 70 to a larger air volume to prevent build-up of high air pressures that would adversely affect the function of the accumulator 10. To achieve the necessary venting, a passageway 114 is drilled in the pump housing 14 from the rear surface 34. As seen in FIGS. 2 and 3, the passageway 114 is closely spaced from the accumulator bore inner wall 50 so as to form a relatively thin wall thickness T between the passageway 114 and the inner wall 50. In the preferred embodiment, the wall thickness T is approximately 0.5 mm. The angle of drilling and size of the hole for the passageway 114 are not critical as long as the communication between the vent bore 118 and the motor 18 is achieved and the passageway 114 does not break into the accumulator bore 42. Alternatively, if it were desired to vent the accumulator bore 42 to the ECU (not shown) or directly to the atmosphere, instead of, or in addition to the motor 18, the passageway 114 could be drilled from any suitable exterior surface on the pump housing 14.

A vent bore 118 is formed in the inner wall 50 to allow communication between the spring chamber 70 and the passageway 114. The vent bore 118 is formed in such a way as to allow the piston 62 and the sealing member 90 to pass over the vent bore 118 substantially without interference. As used herein, "substantially without interference" means that substantially no burrs, edges or other abnormalities associated with the vent bore 118 interfere with the movement or integrity of the piston 62 or sealing member 90 in any way during assembly or operation of the accumulator 10. No costly deburring processes are required. Furthermore, no modifications to the piston 62 or sealing member 90 need to be made to avoid substantial interference.

In the preferred embodiment, the vent bore 118 is formed (see FIG. 3) using a punch 122. The punch 122 is made from a suitable metal and includes body portion 126, transition portion 128 and a punching portion 130. In the illustrated embodiment, the punching portion 130 is substantially cylindrical, but this need not be the case. The transition portion 128 transitions from the punching portion 130 into the body portion 126 with a radius R. The punch 122 moves radially outward relative to the bore 42 to form the vent bore 118. In other words, the punching stroke is in a direction away from the axis 46 of the accumulator bore 42. The punch 122 is placed at least partially inside the accumulator bore 42 and the punching stroke causes the punching portion 130 to enter the inner wall 50 until the punching portion 130 intersects the passageway 114.

Since the punching stroke moves away from the axis 46, the punching portion 130 and transition portion 128 enter the inner wall 50 without causing the formation of any burrs, edges or other abnormalities that would extend from the inner wall 50 in a direction toward the axis 46. More specifically, the radius R of the transition portion 128 acts to coin or emboss the vent bore 118 during the punching process, producing a slight recess in the inner wall 50 where the vent bore 118 is located. Thus, the piston 62 can be inserted into the accumulator bore 42 without fear that the piston 62 or the sealing member 90 may be damaged while passing over the vent bore 118. Likewise, there is substantially no risk of damage to the piston 62 or sealing member 90 during operation of the accumulator 10.

The punching stroke may be accomplished manually or automatically, and as such, the relatively thin wall thickness T may be any thickness that permits the punching stroke to create a vent bore 118 that communicates with the passageway 114. The punching portion 130 may be any size and any shape suitable to provide an adequately sized vent bore 118. To accurately achieve the proper size and shape vent bore 118, it is preferred that the punching stroke be substantially perpendicular to the axis 46. Furthermore, the substantially perpendicular punching stroke helps insure that no burrs, edges or other abnormalities are created around the vent bore 118.

The piston 62 may be inserted into the accumulator bore 42 after punching the bore 118, or alternatively, the piston 62 may be inserted into the accumulator bore 42 prior to punching the vent bore 118. Unlike the common method of drilling the vent bore 118 through the pump housing 14 and into the accumulator bore 42, punching the vent bore 118 from inside the accumulator bore 42 eliminates the risk of drilling into a pre-installed piston 62 and provides another option for the order of assembly. With the vent bore 118 punched, air from the spring chamber 70 can be vented through the vent bore 118, into the passageway 114 and into a larger air volume in the motor 18. The venting is achieved in a simple and inexpensive manner.

When more than one accumulator bore 42 is present in the pump housing 14, each accumulator bore 42 may be vented in the manner described above. Alternatively, if two accumulator bores 42 are close enough together, one common passageway 114 may be used to vent both accumulator bores 42. If the passageway 114 is close enough to both accumulator bores 42, two distinct vent bores 118 could be punched such that both vent bores 118 intersect the common passageway 114 on substantially opposite sides. This would further reduce the machining time and cost needed to vent the accumulators 10.

Various features of the invention are set forth in the following claims.

What is claimed is:

1. A hydraulic accumulator assembly for a hydraulic brake system, the accumulator assembly comprising:
   a pump housing having therein at least one accumulator bore, said accumlator bore having an inner wall;
   a piston movable within said accumulator bore, said piston dividing said accumulator bore into an accumulator chamber for receiving a hydraulic fluid and a spring chamber housing a gas, said accumulator chamber being communicable with the hydraulic brake system, and said spring chamber being substantially sealed from said accumulator chamber;
   a spring in said spring chamber for biasing said piston in the direction of said accumulator chamber; and
   a vent bore communicating with said spring chamber, said vent bore intersecting said inner wall and being formed in a way that allows said piston to pass over said vent bore substantially without interference.

2. The hydraulic accumulator assembly of claim 1, wherein said inner wall is substantially cylindrical.

3. The hydraulic accumulator assembly of claim 1, further comprising a cover over said accumulator bore for sealing said bore from the environment.

4. The hydraulic accumulator assembly of claim 1, further comprising a passageway in said pump housing and closely spaced from said inner wall so as to form a relatively thin wall thickness between said passageway and said inner wall, and wherein said vent bore communicates with said passageway.

5. The hydraulic accumulator assembly of claim 4, wherein said relatively thin wall thickness is approximately 0.5 mm.

6. The hydraulic accumulator assembly of claim 4, wherein said vent bore is formed by a punching stroke.

7. The hydraulic accumulator assembly of claim 6, wherein said accumulator bore has an axis, and said vent bore is formed by a punching stroke in a direction away from said axis.

8. The hydraulic accumulator assembly of claim 7, wherein said punching stroke is substantially perpendicular to said axis.

9. The hydraulic accumulator assembly of claim 1, wherein said accumulator bore further includes an end wall.

10. The hydraulic accumulator assembly of claim 9, wherein said end wall includes an opening communicable with the hydraulic brake system.

11. A hydraulic accumulator assembly for a hydraulic brake system, the accumulator assembly comprising:
    a pump housing having therein at least one accumulator bore, said accumulator bore having an axis and an inner wall;
    a piston movable within said accumulator bore, said piston dividing said accumulator bore into an accumulator chamber for receiving a hydraulic fluid and a spring chamber housing a gas, said accumulator chamber being communicable with the hydraulic brake system, and said spring chamber being substantially sealed from said accumulator chamber;
    a spring in said spring chamber for biasing said piston in the direction of said accumulator chamber;
    a passageway in said pump housing and closely spaced from said inner wall so as to form a relatively thin wall thickness between said passageway and said inner wall; and
    a vent bore which is punched in said inner wall and which communicates between said spring chamber and said passageway, said vent bore being punched in a direction away from said axis.

12. The hydraulic accumulator assembly of claim 11, wherein said relatively thin wall thickness is approximately 0.5 mm.

13. The hydraulic accumulator assembly of claim 11, wherein said vent bore is formed by a punching stroke substantially perpendicular to said axis.

14. The hydraulic accumulator assembly of claim 11, further comprising a cover over said accumulator bore for sealing said bore from the environment.

15. The hydraulic accumulator assembly of claim 11, wherein said accumulator bore further includes an end wall.

16. The hydraulic accumulator assembly of claim 15, wherein said end wall includes an opening communicable with the hydraulic brake system.

17. A method of venting a hydraulic accumulator for a hydraulic braking system having a pump housing and an accumulator bore in the pump housing, the accumulator bore having an axis, an inner wall and an end wall, the end wall having an opening communicating with the hydraulic brake system, the method comprising:
    forming a passageway in the pump housing, the passageway being closely spaced from the inner wall so as to form a relatively thin wall thickness between said passageway and the inner wall; and punching a vent bore in the inner wall such that said vent bore communicates between the accumulator bore and said passageway, said vent bore being punched in a direction away from the axis.

18. The method of claim 17, wherein said forming a passageway further includes locating said passageway such that said relatively thin wall thickness is approximately 0.5 mm.

19. The method of claim 17, wherein said punching a vent bore further includes utilizing a punching stroke substantially perpendicular to the axis.

20. The method of claim 17, wherein the hydraulic accumulator further includes a piston movable within the accumulator bore, and wherein said vent bore is punched such that the piston can pass over said punched vent bore substantially without interference.

21. A hydraulic brake system comprising:

a motor; and a pump housing coupled to the motor, the pump housing having an accumulator assembly including an accumulator bore defined in the pump housing, said accumulator bore having an inner wall and an end wall, the end wall including an opening communicable with the brake system;

a piston movable within said accumulator bore, said piston dividing said accumulator bore into an accumulator chamber for receiving a hydraulic fluid present in the brake system and a spring chamber housing a gas and being substantially sealed from said accumulator chamber;

a spring in said spring chamber for biasing said piston in the direction of said accumulator chamber;

a vent bore communicating with said spring chamber, said vent bore intersecting said inner wall and being formed in a way that allows said piston to pass over said vent bore substantially without interference; and a cover over said accumulator bore for sealing said bore from the environment.

22. The hydraulic brake system of claim 21, wherein said gas in said spring chamber is air.

23. The hydraulic brake system of claim 21, wherein said vent bore communicates with said motor to vent said gas in said spring chamber to a larger volume of gas in said motor.

24. The hydraulic brake system of claim 21, further comprising a passageway in said pump housing and closely spaced from said inner wall so as to form a relatively thin wall thickness between said passageway and said inner wall, and wherein said vent bore communicates with said passageway.

25. The hydraulic brake system of claim 24, wherein said relatively thin wall thickness is approximately 0.5 mm.

26. The hydraulic brake system of claim 24, wherein said vent bore is formed by a punching stroke.

27. The hydraulic brake system of claim 26, wherein said accumulator bore has an axis, and said vent bore is formed by a punching stroke in a direction away from said axis.

28. The hydraulic brake system of claim 27, wherein said punching stroke is substantially perpendicular to said axis.

* * * * *